United States Patent [19]

Carlson

[11] 4,156,793

[45] May 29, 1979

[54] GROUND ROD ASSEMBLY

[76] Inventor: Fred B. Carlson, 213 - 90th Ave., Vero Beach, Fla. 32960

[21] Appl. No.: 810,093

[22] Filed: Jun. 27, 1977

[51] Int. Cl.[2] ........................... H01R 3/06; F16B 7/00

[52] U.S. Cl. ........................................ 174/7; 29/525; 403/215; 403/282; 403/305; 403/333

[58] Field of Search ......................... 174/6, 7; 29/525; 52/165; 256/47; 339/14 L, 244 R, 273 R; 403/206, 209, 211, 215, 274, 279, 281, 282, 285, 305, 333, 334, 361, 396

[56] References Cited

U.S. PATENT DOCUMENTS

| | | | |
|---|---|---|---|
| 991,517 | 5/1911 | Kennedy | 403/361 |
| 1,064,920 | 6/1913 | Lovejoy | 403/215 X |
| 1,157,666 | 10/1915 | Bennett | 29/525 |
| 1,731,171 | 10/1929 | Miller | 285/133 A X |
| 2,111,799 | 3/1938 | Newpher | 174/7 |

FOREIGN PATENT DOCUMENTS

| | | | |
|---|---|---|---|
| 250812 | 4/1964 | Australia | 174/7 |
| 473618 | 5/1951 | Canada | 174/7 |
| 1267320 | 6/1961 | France | 174/7 |
| 2297344 | 8/1976 | France | 403/300 |

*Primary Examiner*—Laramie E. Askin
*Attorney, Agent, or Firm*—Barry L. Haley; Eugene F. Malin

[57] ABSTRACT

An improvement for the assembly of ground rods, comprising a fitting having two threaded portions, the first as a guide portion being adapted to receive an unthreaded ground rod and a threaded gripping portion adapted to grip the end of a rod through deformation of the threads when the rod is forceably inserted in the fitting. Conjointly usable therewith is a similarly threaded terminal fitting adapted to receive an electrical ground line and retain the same permanently in a contact position when the fitting is forceably driven on the rod.

1 Claim, 10 Drawing Figures

GROUND ROD ASSEMBLY

This invention is directed to improvements for ground rods.

BACKGROUND OF THE INVENTION

It is the general practice in the installation of electrical transmission towers to provide electrical ground connections, known as "ground rods." The customary installation includes the driving of ground rods contiguous to the towers to a depth of as many feet as practical. These rods are frequently copper-clad, have threaded ends, and are connected one to the other by threaded couplings. At the exterior or exposed end of the rod, it is customary to connect a copper line to the tower and clamp it to the rod by a clamp, held normally in place by a set screw.

DESCRIPTION OF THE INVENTION

As presently designed, the ends of the rods for engagement with the coupling are threaded, the couplings being interiorly threaded and, as noted, the clamps are affixed by some screw-threaded means.

One of the objects of this invention is to avoid the expense of threading the rods, while, at the same time, providing a permanent and immovable bond between the rods and the couplings.

Another object of this invention is to provide a simple, efficacious means, capable of being conjointly used with the couplings, for connecting the electrical ground line from the tower to the exposed portion of the rod.

DESCRIPTION OF THE DRAWINGS

Referring now particularly to the drawings.

DESCRIPTION OF THE PREFERRED EMBODIMENT

Figure 1:
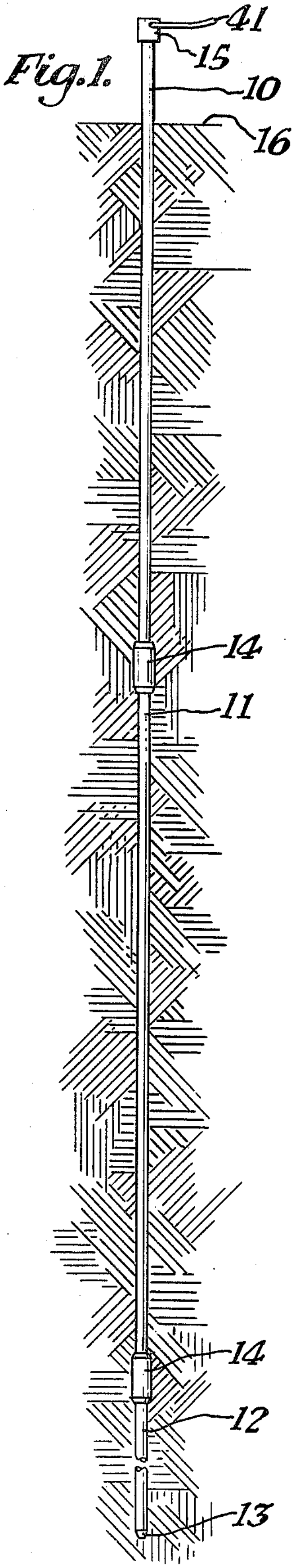
FIG. 1 discloses a sectional view of a depth of soil in which the rods, in elevation, are shown in installed position with the line to the tower, broken away, connected to the terminal fitting.

Referring now to FIG. 1, the assembly includes a terminal rod 10, a medial rod 11, and a distal rod 12, said distal rod having a conical tip 13, to facilitate driving into the ground; the respective rods are connected with one another by medial fittings 14 and the ground wire 41 is connected to the terminal fitting 15 in the portion of the terminal rod protruding above the ground 16. Each of the rods 10 and 11 has bevelled ends 17 to facilitate insertion into the fittings 14, 15, and the distal rod is bevelled at its end opposite the conical tip 13 for the same reason.

Figure 2:
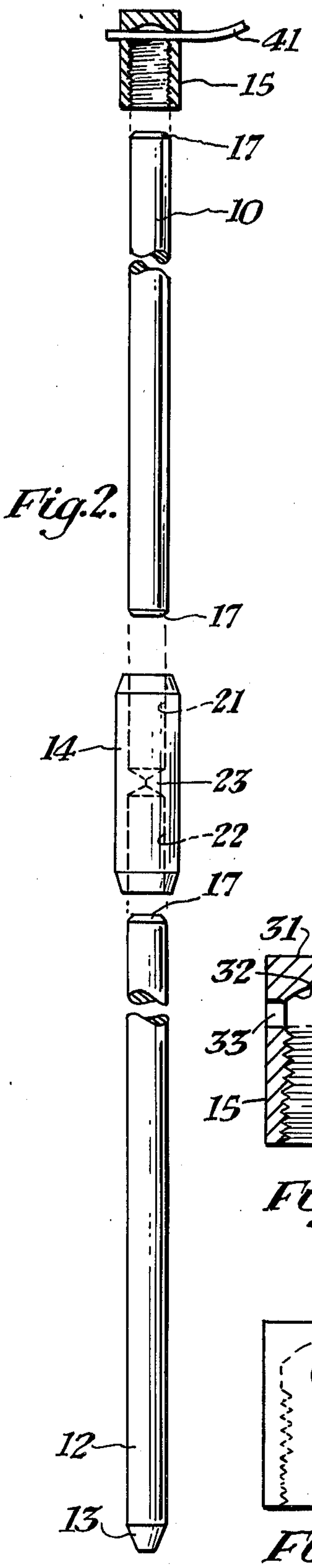
FIG. 2 is an exploded view of a distal and terminal rod with a medial fitting therebetween and a terminal cap, in section, with a ground wire inserted preliminary to final assembly.

FIG. 2 shows the elements of FIG. 1 is an enlarged form in their relationships preliminary to assembly during the process of installation.

The medial fitting will now be described. It includes a proximal bore 21, a distal bore 22 with a barrier 23 therebetween. Each of the bores is threaded in two portions, the diameter between the crests of the threads in the guide portion 24 being greater than the diameter between the crests of the threads in the gripping portion 25, see FIG. 3. In producing such fittings, I have found that the best method is to tap to the depth of the bore for the gripping portion, FIG. 4*a*, then ream to the outside diameter of the rod to be guided to form the guide portion, FIG. 4*b*, the reaming tool, 26, being shown in side elevation.

Figure 5:
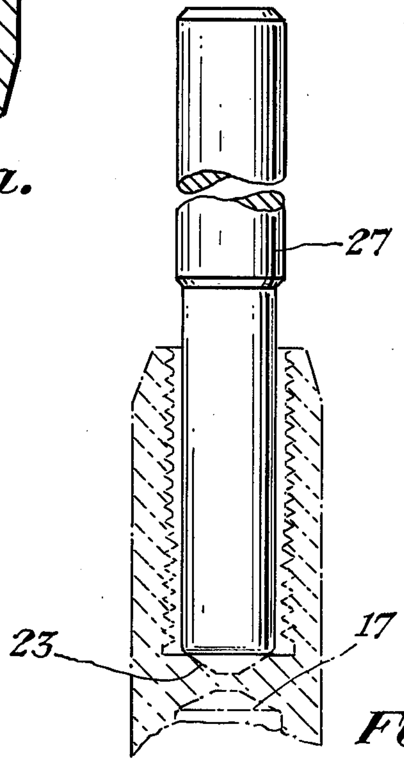
FIG. 5 is a side elevational view of a medial fitting, partly broken away with a drift pin in side elevation inserted showing one stage of the assembly of rods and fittings as hereinafter described.

The distance between the crests of the threads in the guide portion 24 is such that it provides a close fit with the rod making the axis of the rod and fitting coaxial and is of sufficient length to retain this relationship during assembly. When the fitting is being assembled to the rod, after the rod is normally in a vertical position in the ground, the fitting is properly aligned with the rod so that when the fitting is driven onto the rod, as by a manually operated hammer, such coaxial relationship will be retained. In the assembly operation, I prefer not to apply the face directly to the medial fitting 14 and employ a headed drift pin, 27, FIG. 5, which fits loosely within the gripping portion 25 and bears on the barrier 23. The use of the drift pin, 27, FIG. 5, is, of course, unnecessary with the terminal fitting 15.

Figure 4A:
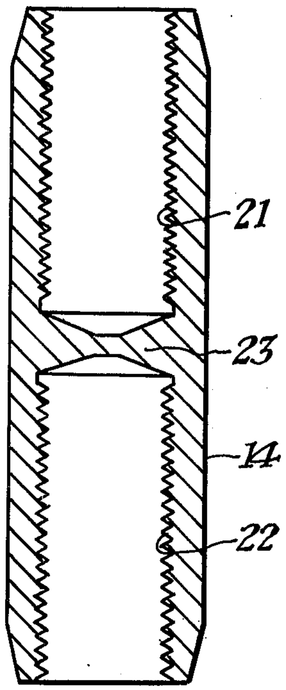
FIGS. 4*a* through 4*d* are sectional views, greatly enlarged and in some instances, partly broken away, showing the sequences of the preparation of the construction of and preliminary and final assembly of the ground rod to a medial fitting.
Figure 4B:
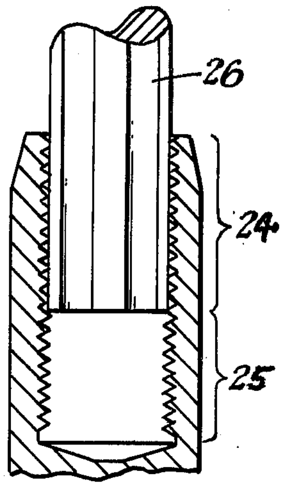
Figure 4C:
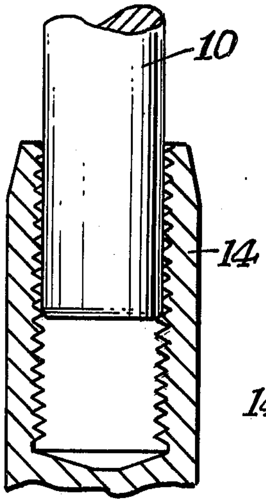
Figure 4D:
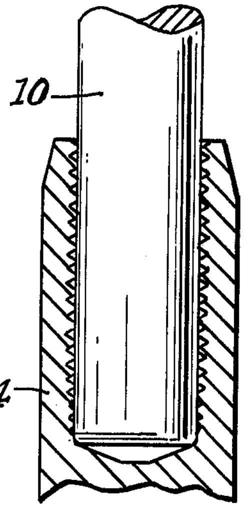

During the course of the driving operation, the internal threads on the gripping portion of the fitting are deformed, see FIGS. 4*b*, 4*c*, so that after the fitting has been driven the length of the bore on to the rod, there is a firm, unseverable connection between the fitting and the rod.

To insert the next rod in sequence into the medial fitting, the opposite procedure is then followed and the rod, after being located in coaxial relationship by insertion into the guide portion 24, the fitting is then driven to the full length of the gripping portion, providing an equally efficacious connection between the rod and the fitting.

The preferred material for the medial fittings 14 and the terminal fitting 15 is Phosphor-bronze of the type known as alloy No. 544 having a Brinell hardness of approximately 150, comprising 4% each of zinc, lead and tin, 0.1% phosphorous, the balance being copper. The rods are preferably copper-clad steel.

This sequence of operations is then repeated to provide for the interconnection between the desired number of rods, finally leaving a portion of the terminal rod protruding above the ground.

The terminal fitting is similar in its material and threaded characteristics to one of the bores of any medial fitting, above described. It has, however, a base 31 and internally a well, 32, with coaxial openings, 33, 33, as shown particularly in FIGS. 3*a* and 3*b*.

Figure 3:
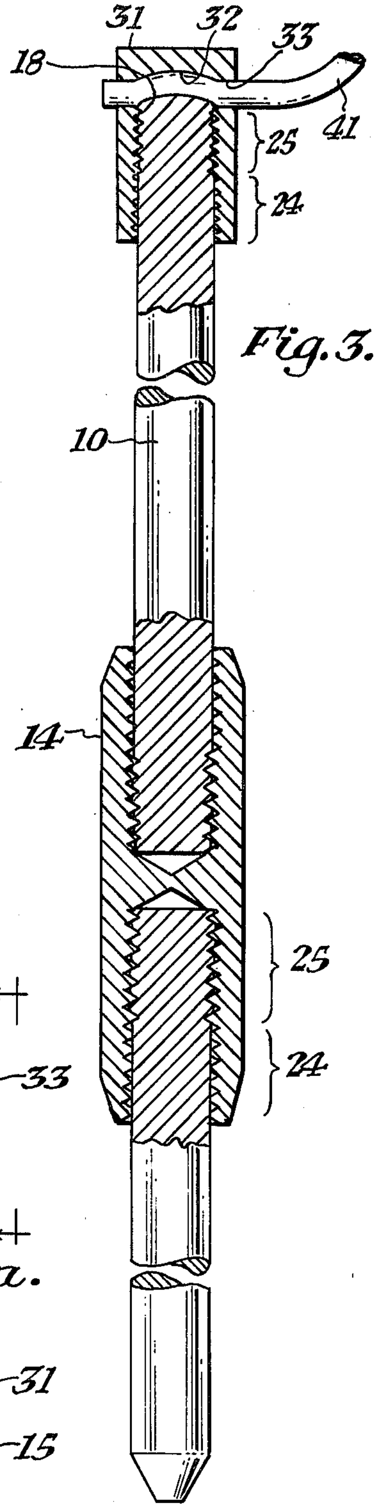
FIG. 3 is a view, partly in elevation and partly in section, showing the rods permanently connected to the medial fitting, and the terminal fitting, or cap, in position with the ground wire firmly clamped thereto.
Figure 3A:
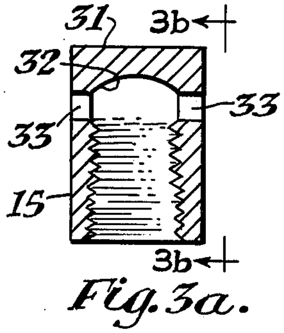
FIG. 3*a* is a sectional view of the terminal fitting or cap in an unassembled form.
Figure 3B:
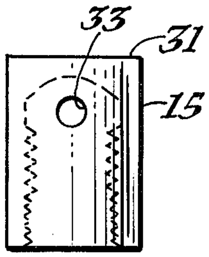
FIG. 3*b* is an elevational view of the terminal fitting taken along the line 3*b*—3*b* of FIG. 3*a*, showing one of the openings for insertion of the ground wire.

The proximal end of the terminal rod 10 in addition to the bevel 17 may have a slight radius to deform the ground wire, as shown at 18 in FIG. 3.

Prior to the application of the terminal fitting or cap 15 to the terminal end of the ground rod 10, the ground wire 41 is inserted through the coaxial opening 33 to the extent that a portion thereof protrudes beyond the opening opposite to the opening in which it is inserted, and then the terminal fitting 15 is driven on the terminal rod 10 in the manner described. This provides a permanent and efficacious clamping of the ground wire 41 so that it will not be removable from its connection with the ground rod assembly by any normal application of force.

Having fully described my invention, I claim:

1. A ground rod and fitting, comprising:

a conductive rod having a smooth, unthreaded end;

a conductive fitting for connection to the smooth, unthreaded end of said rod, said fitting having an internal bore and a bore opening, said fitting internal bore including a threaded guide portion and a threaded gripping portion, the threaded guide portion being closer in proximity to the fitting bore opening than the threaded gripping portion, the diameter between the crests of the threads in the guide portion being greater than the diameter between the crests of said threaded gripping portion, said rod unthreaded end diameter being less than or equal to the diameter between the crests of the guide portion and greater than the diameter between the crests of the gripping portion, whereby when the rod end is driven to the depth of the internal bore of the fitting, the fitting guide portion will guide the smooth, unthreaded end of the rod into coaxial alignment with the axis of the bore of the fitting and the gripping portion will hold the rod in engagement with the fitting.

* * * * *